United States Patent
Jao

(10) Patent No.: US 6,919,655 B1
(45) Date of Patent: Jul. 19, 2005

(54) INDUCTION-TYPE GYRATOR CAPABLE OF RECIPROCATING AND VIBRATING MOTIONS

(75) Inventor: Chen-Chi Jao, Miao Li Hsien (TW)

(73) Assignee: Forcecon Technology Co., Ltd., Hsin Chu Hsien (TW)

( * ) Notice: Subject to any disclaimer, the term of this patent is extended or adjusted under 35 U.S.C. 154(b) by 0 days.

(21) Appl. No.: 10/830,146

(22) Filed: Apr. 23, 2004

(51) Int. Cl.[7] .............................................. H02K 33/00
(52) U.S. Cl. ........................................ 310/36; 310/81
(58) Field of Search .............................. 310/36–39, 81, 310/89–90, 268

(56) References Cited

U.S. PATENT DOCUMENTS

| | | | | | |
|---|---|---|---|---|---|
| 3,794,865 | A | * | 2/1974 | Guttinger ...................... 310/82 |
| 4,945,269 | A | * | 7/1990 | Kamm ........................... 310/15 |
| 5,463,263 | A | * | 10/1995 | Flynn ............................ 310/181 |
| 5,903,076 | A | * | 5/1999 | Suyama ......................... 310/81 |
| 6,753,630 | B1 | * | 6/2004 | Ueda et al. .................... 310/81 |
| 6,781,270 | B2 | * | 8/2004 | Long ............................ 310/90.5 |

* cited by examiner

Primary Examiner—Thanh Lam
(74) Attorney, Agent, or Firm—Harrison & Egbert

(57) ABSTRACT

A gyrating device includes a stator and a rotor. The stator is formed of at least one induction member and two induction coils connected with the induction member by an induction signal. The rotor is formed of at least one magnet and two inductors. The rotor is caused to engage in a reciprocating motion by an attracting force and a repelling force, which are brought about between the magnet and the induction coils at the time when the induction coils are driven by a voltage. The action force and the reaction force of the reciprocating motion of the rotor can be changed at a speed by adjusting the voltage, thereby resulting in a vibrating motion of the rotor.

10 Claims, 10 Drawing Sheets

INDUCTION-TYPE GYRATOR CAPABLE OF RECIPROCATING AND VIBRATING MOTIONS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a gyrating device, and more particularly to an induction-type gyrating device which is capable of reciprocating motion and effecting vibrational motion.

BACKGROUND OF THE INVENTION

The conventional mechanical gyrator is capable of reciprocating motion; nevertheless it is complicated in construction, noisy, and large in volume. Such cumbersome mechanical gyrator is inefficient and not cost-effective at best.

BRIEF SUMMARY OF THE INVENTION

The primary objective of the present invention is to provide an induction-type gyrator free of the deficiencies of the conventional mechanical gyrator described above.

In keeping with the principle of the present invention, the foregoing objective of the present invention is attained by an induction-type gyrator comprising a stator, a rotor, and an induction device disposed between the stator and the rotor. The induction device comprises an induction member, two inductors, and two induction coils. The induction member and the two induction coils are mounted on the upper side of the stator, while the two inductors are mounted in the underside of the rotor. The rotor is provided in the underside with an arcuate magnet fastened therewith. The induction member is connected with the two induction coils by means of induction signal by which the polar interchange of the driving circuits of the two induction coils is repeatedly changed, thereby resulting in a reciprocating motion of the rotor. The gyrator of the present invention is capable of effecting vibrational motion by changing an action force and a reaction force of the reciprocating motion of the rotor.

The features and the advantages of the present invention will be more readily understood upon a thoughtful deliberation of the following detailed description of the preferred embodiments of the present invention with reference to the accompanying drawings.

DETAILED DESCRIPTION OF THE INVENTION

Figure 1:
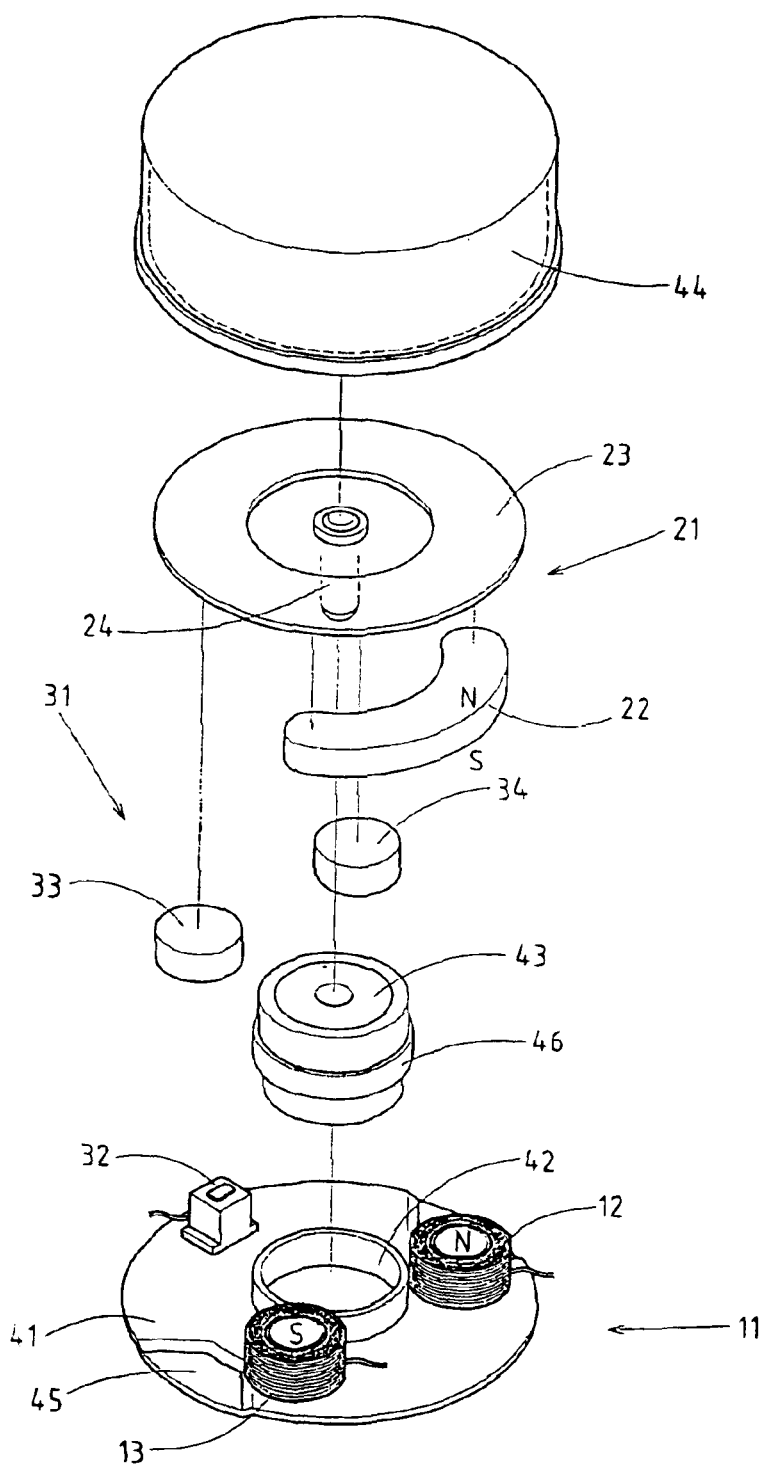
FIG. 1 shows an exploded perspective view of a first preferred embodiment of the present invention.
Figure 2:
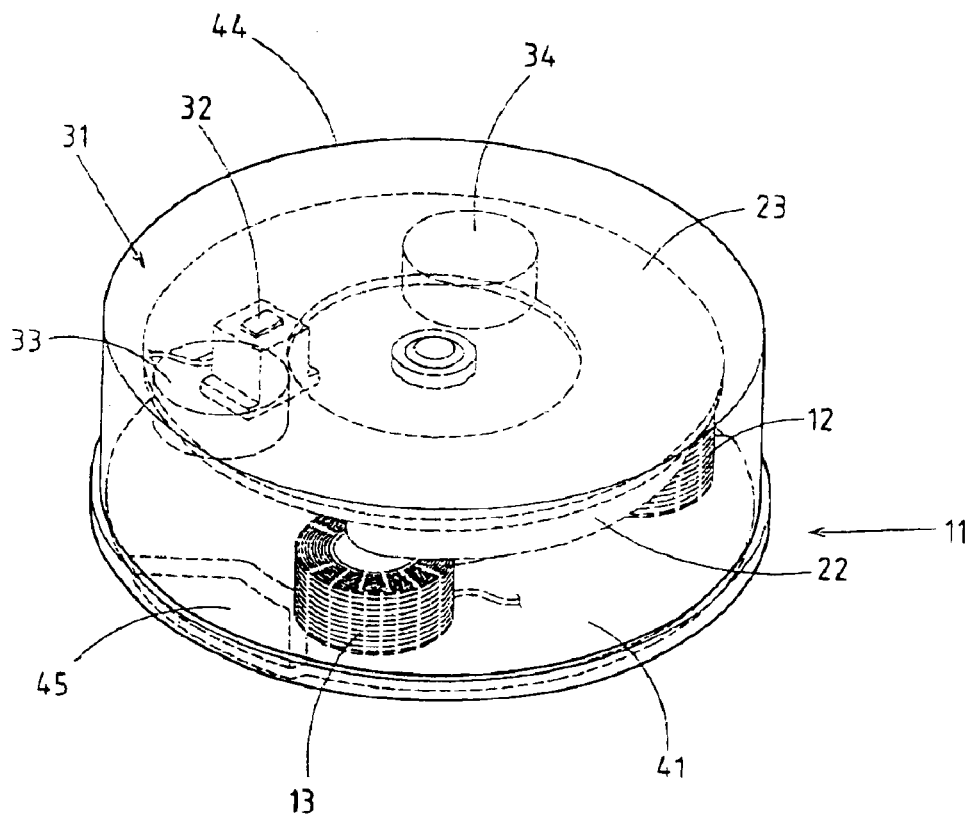
FIG. 2 shows a perspective view of the first preferred embodiment of the present invention.
Figure 3:
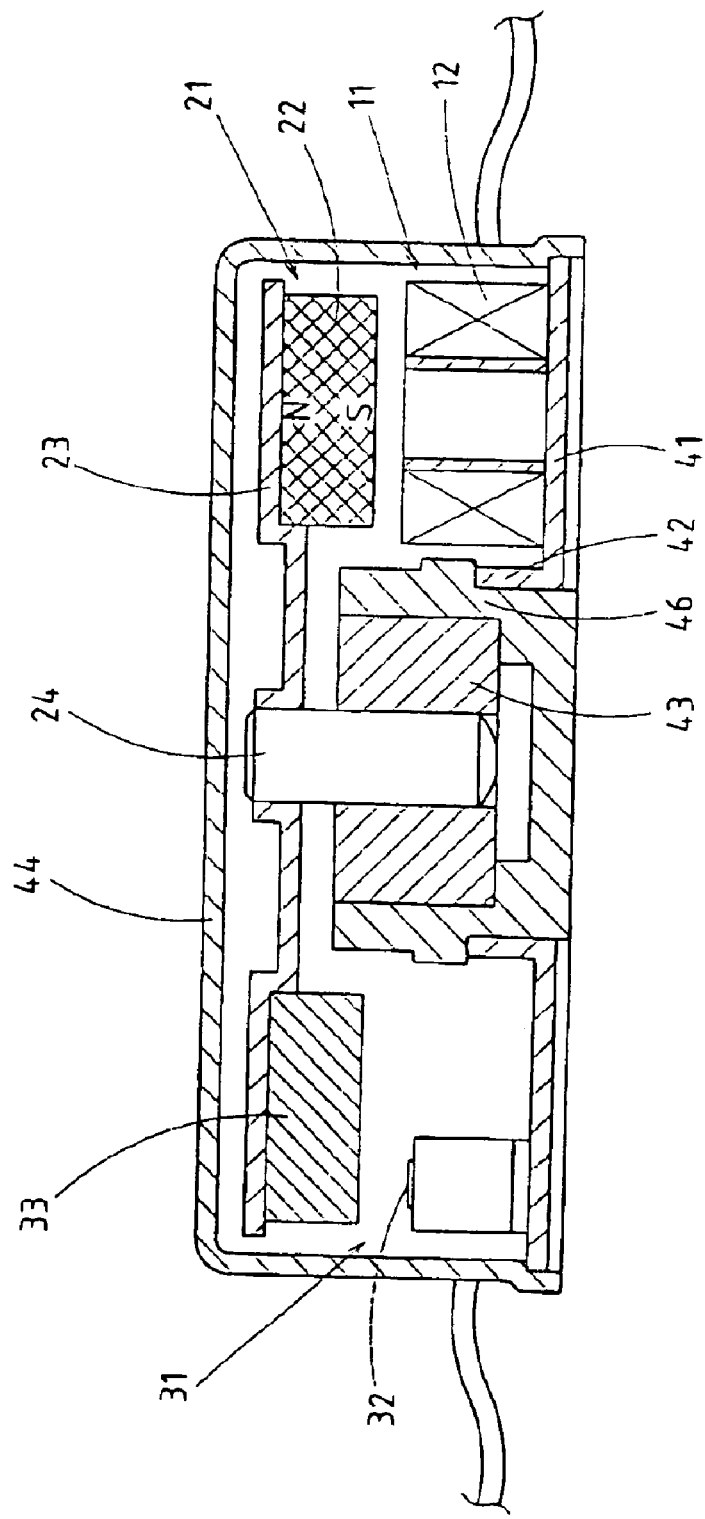
FIG. 3 shows a longitudinal sectional view of the first preferred embodiment of the present invention as shown in FIG. 2.
Figure 4:
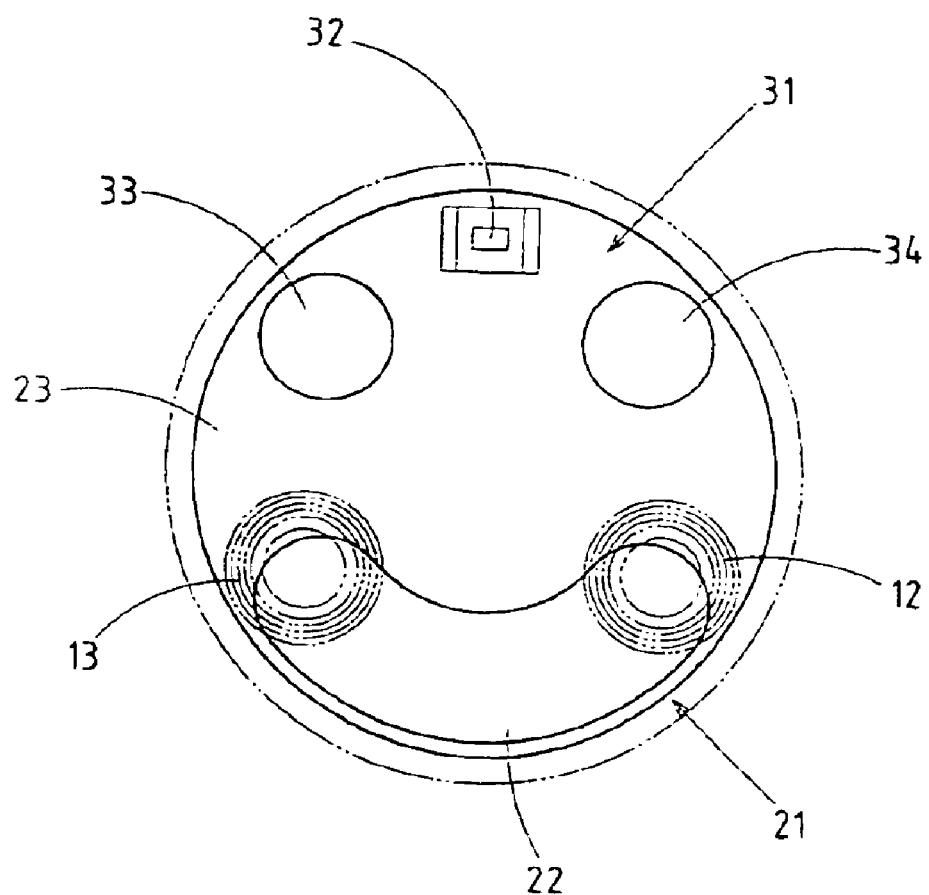
FIG. 4 shows a top schematic view of the first preferred embodiment of the present invention.
Figure 5:
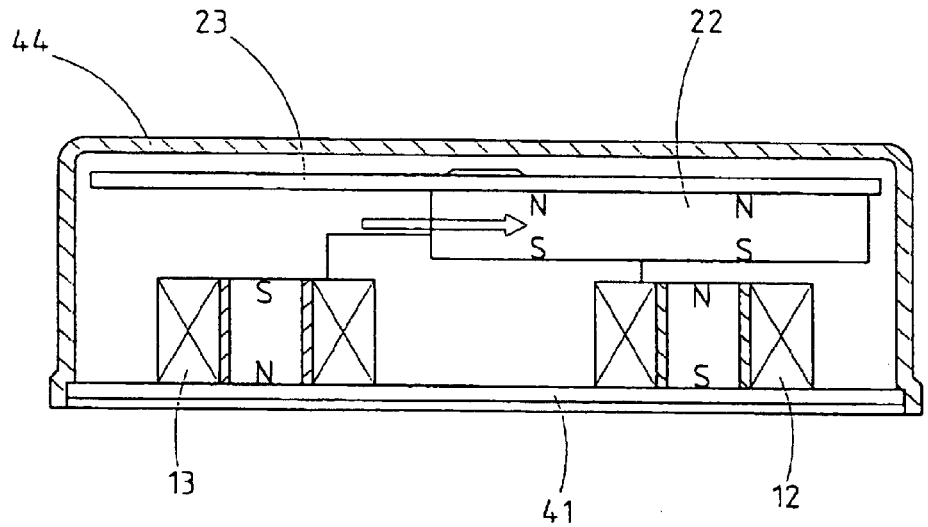
FIG. 5 shows a side schematic view of the first preferred embodiment of the present invention in action.
Figure 6:
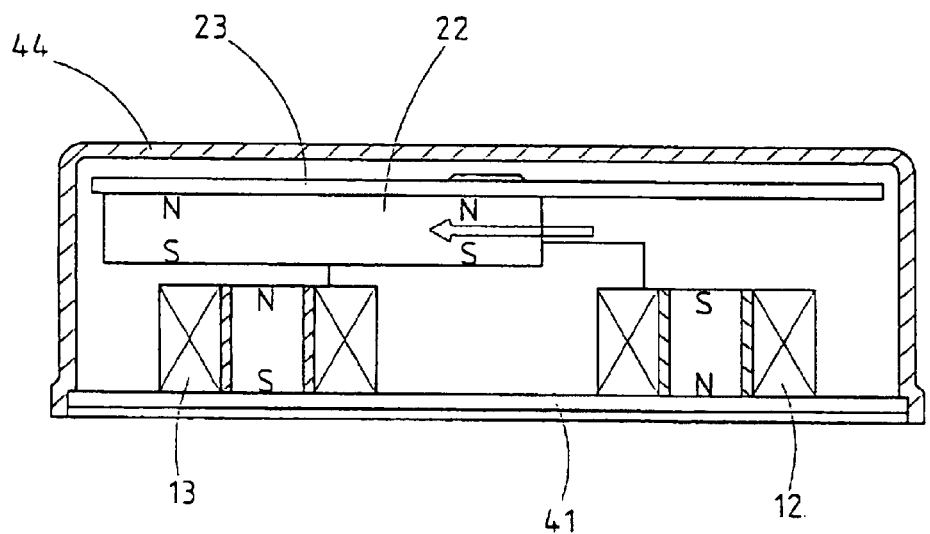
FIG. 6 shows another side schematic view of the first preferred embodiment of the present invention in action.
Figure 7:
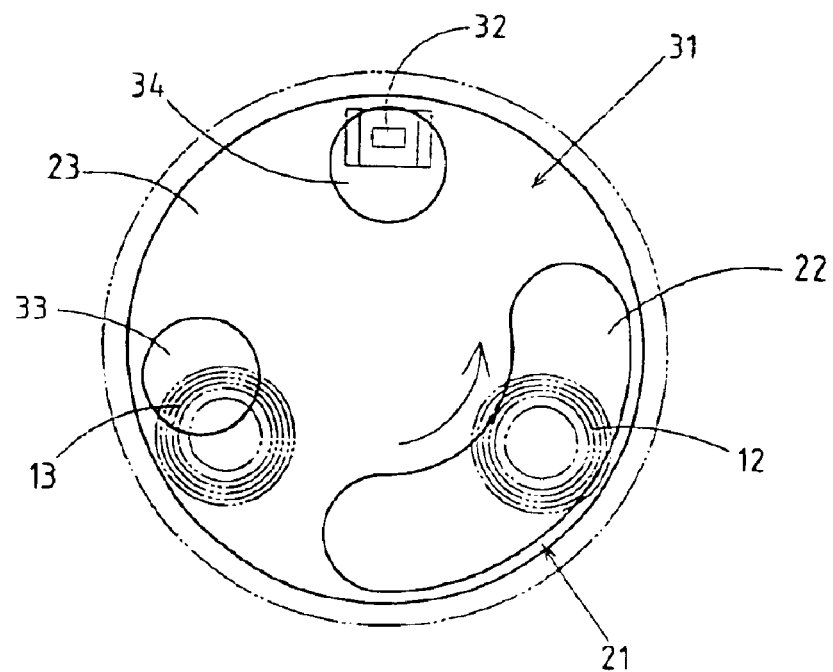
FIG. 7 shows a top schematic view of first preferred embodiment of the present invention in action.
Figure 8:
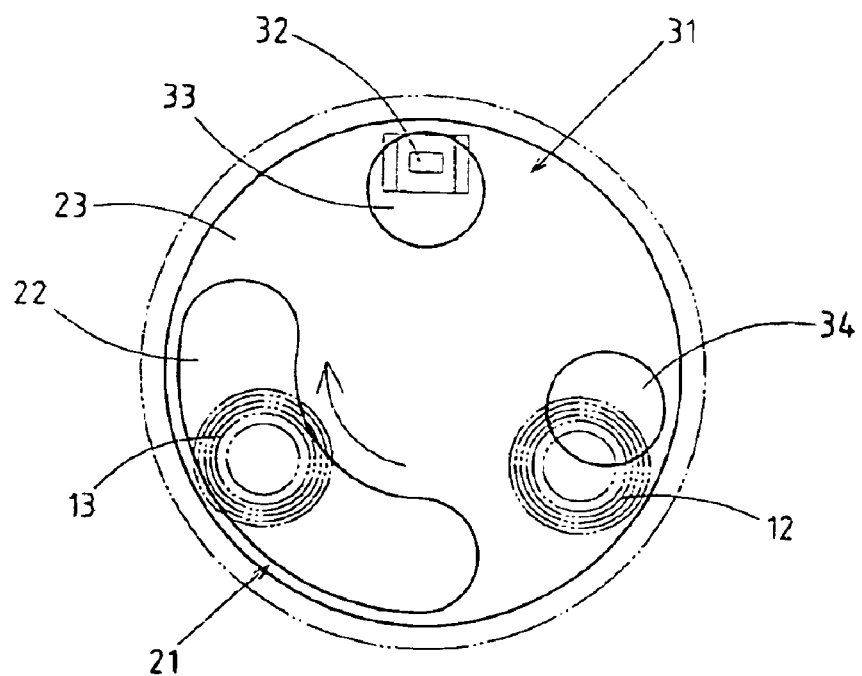
FIG. 8 shows another top schematic view of the first preferred embodiment of the present invention in action.

As shown in FIGS. 1–4, a gyrating device of the present invention comprises a stator 11 and a rotor 21.

The stator 11 is formed of a base 41 on which a first induction coil 12, a second induction coil 13, and an induction member 32 are mounted, with the first induction coil 12 and the second induction coil 13 being opposite in the magnetic pole to each other. The base 41 is provided in the center with a seat 42 for disposing a bearing 43 in conjunction with a collar 46. The induction member 32 is connected to a drive circuit of the induction coils 12 and 13 by means of an induction signal.

The rotor 21 is formed of a rotary disk 23 which is provided in the center with a spindle 24. The rotor 21 is rotatably joined with the stator 11 by the spindle 24 which is received in the bearing 43 of the stator 11. The rotary disk 23 is further provided with an arcuate magnet 22, a first inductor 33, and a second inductor 34, which are fastened with the rotary disk 23 in such a way that the "S" magnetic pole of the arcuate magnet 22 faces the two induction coils 12 and 13 of the stator 11, and that the two inductors 33 and 34 faces the two induction coils 12 and 13, as well as the induction member 32. The rotor 21 is shielded by a cover 44, which is fastened with the stator 11. It must be added here that the arcuate magnet 22 has a length greater than the distance between the two induction coils 12 and 13 of the stator 11.

In operation, the arcuate magnet 22 is induced by the two induction coils 12 and 13 such that an attracting force is brought about between the magnet 22 and the first induction coil 12, and that a repelling force is brought about between the magnet 22 and the second induction coil 13. The rotor 21 is caused by the repelling force to turn, as illustrated in FIGS. 5–8. In light of induction of the two inductors 33 and 34, and the induction member 32, a polar interchange of the drive circuits of the two induction coils 12 and 13 is brought about by an induction signal of the induction member 32. As a result, an attracting force is brought about between the magnet 22 and the second induction coil 13, while a repelling force is brought about between the magnet 22 and the first induction coil 12 so as to cause the rotor 21 to turn in reverse. The rotor 21 is thus capable of a reciprocating motion. It is conceivable that the driving force of the rotor 21 can be enhanced by a corresponding increase in number of the magnet 22 of the rotor 21 and the induction coils 12 and 13 of the stator 11.

Figure 9:
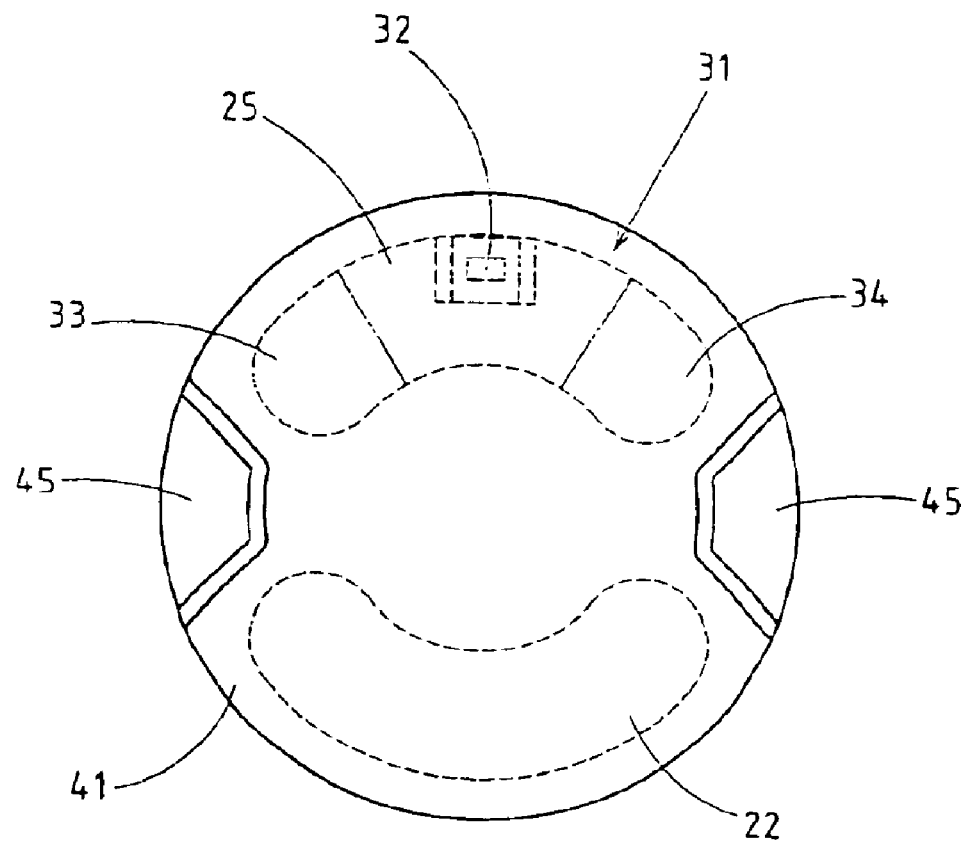
FIG. 9 shows a top schematic view of a second preferred embodiment of the present invention.

As shown in FIG. 9, the rotor 21 is further provided with a magnet 25 which is located between the two inductors 33 and 34, and is opposite in location to the arcuate magnet 22. This second magnet 25 is used to keep the rotary disk 23 of the rotor 21 in an inertial state.

Figure 10:
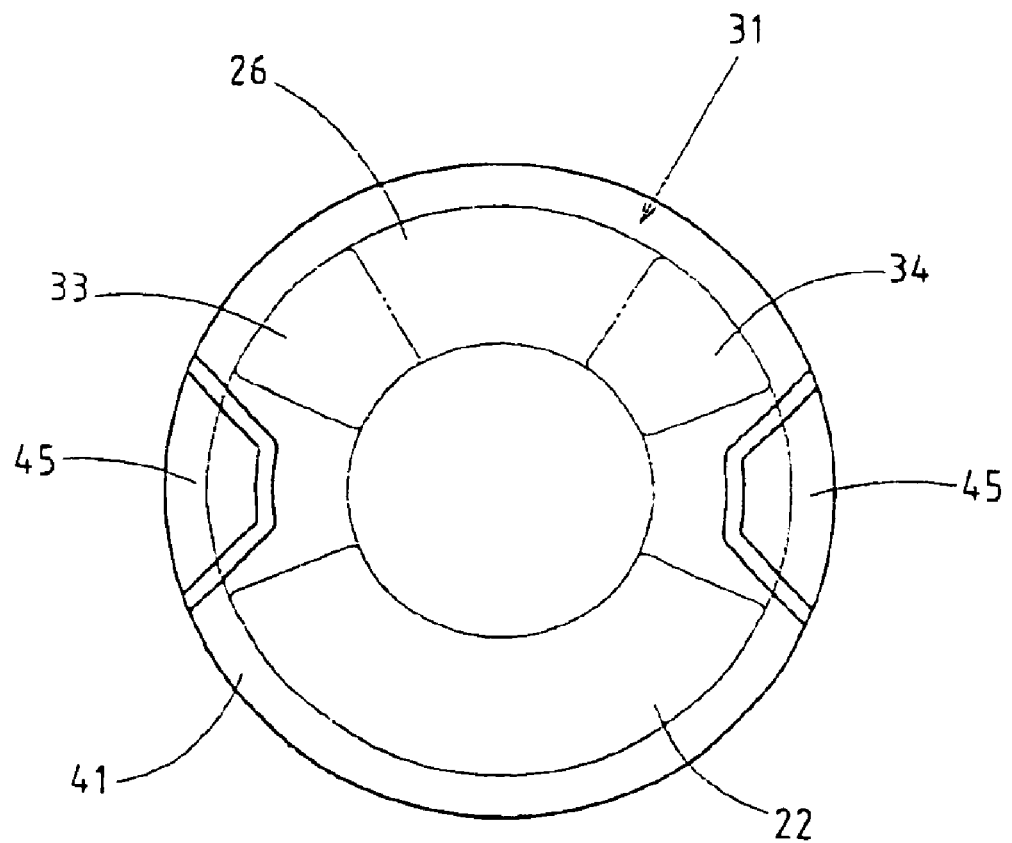
FIG. 10 shows a top schematic view of a third preferred embodiment of the present invention.

As shown in FIG. 10, the rotor 21 is provided with an annular magnet 26 on which the arcuate magnet 22 and the two inductor 33 and 34 are disposed. The annular magnet 26 serves to keep the rotary disk 23 of the rotor 21 in an inertial state.

As shown in FIGS. 9 and 10, the base 41 of the stator 11 is provided with two low magnetic areas 45 opposite to each other. These two low magnetic areas 45 serve to enable a magnetic force center of the arcuate magnet 22 to be attracted to a magnetic force center of the high magnetic areas located between the two low magnetic areas 45. In another words, the rotary disk 23 of the rotor 21 is thus enabled to remain at rest at a specific point at the time when the two induction coils 12 and 13 are not driven by the circuit. The arcuate magnet 22 is thus on standby.

Figure 11:
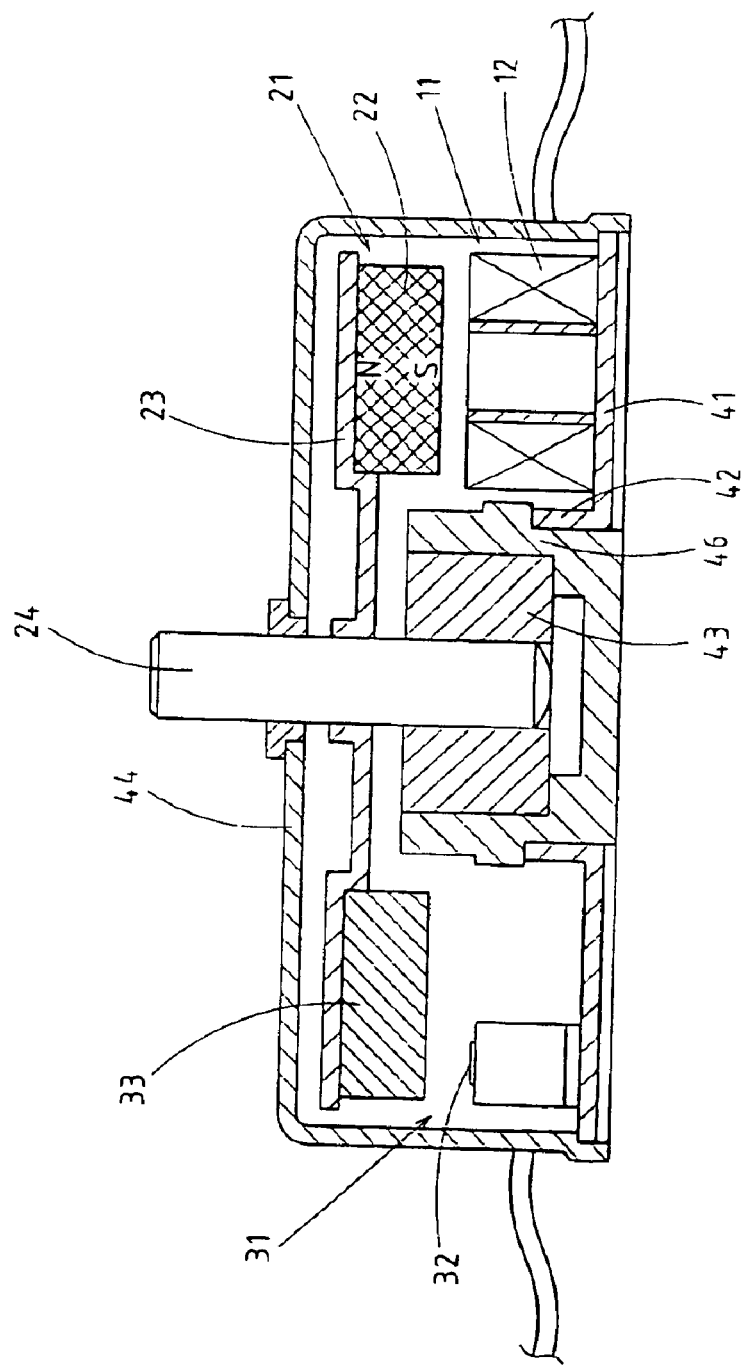
FIG. 11 shows a longitudinal sectional view of a fourth preferred embodiment of the present invention.
Figure 12:
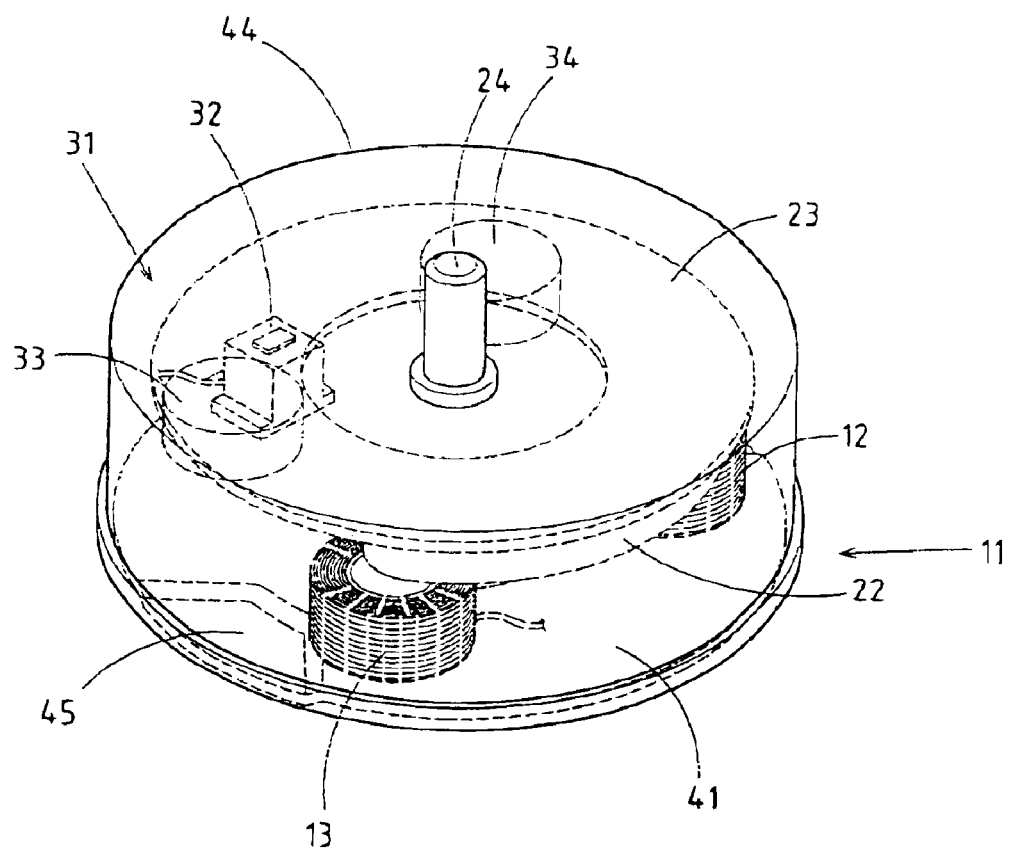
FIG. 12 shows a perspective view of the fourth preferred embodiment of the present invention as shown in FIG. 11.

As shown in FIGS. 11 and 12, one end of the spindle 24 is so extended as to jut out of the cover 44, thereby enabling the spindle 24 to serve as a drive shaft.

The action force and the reaction force of the reciprocating motion of the rotor 21 can be changed at a high speed by changing the magnitude of a voltage by which the two induction coils 12 and 13 of the stator 11 are driven. As a result, the gyrating device of the present invention is provided with a vibrating effect. Furthermore, the gyrating device of the present invention can be caused to vibrate in a desired pattern by a specific voltage adjustment. The vibration force of the gyrating device of the present invention can be adjusted in its intensity by adding a predetermined number of weight to the rotor 21.

The embodiments of the present invention described above are to be regarded in all respects as being illustrative and nonrestrictive. Accordingly, the present invention may be embodied in other specific forms without deviating from the spirit thereof. The present invention is therefore to be limited only by the scope of the following claims.

I claim:

1. An induction-type gyrating device comprising:
   a stator comprised of a base, at least one induction member mounted on said base, and at least two induction coils mounted on said base such that said two induction coils are opposite in the magnetic pole, said base being provided with a seat for mounting a bearing in conjunction with a collar; and
   a rotor comprised of a rotary disk, at least one first magnet fastened to said rotary disk such that said first magnet faces said induction coils of said stator, said rotor further comprised of two inductors fastened to said rotary disk such that said two inductors are opposite in location to said first magnet, said rotary disk being provided with a spindle which is joined with said bearing of said base of said stator whereby said rotary disk is caused to engage in a reciprocating motion by an attracting force and a repelling force which are brought about between said first magnet of said rotor and said induction coils of said stator at the time when said induction coils are driven by a voltage.

2. The gyrating device as defined in claim 1, wherein the reciprocating motion of said rotary disk of said rotor is enhanced by an increase in number of said induction coils of said stator and said first magnet of said rotor.

3. The gyrating device as defined in claim 1, wherein said rotor is further comprised of a second magnet whereby said second magnet is fastened between said two inductors to enable said rotor to remain in an inertial state.

4. The gyrating device as defined in claim 3, wherein said second magnet is fastened to said rotary disk of said rotor such that said two inductors and said first magnet are disposed on said second magnet.

5. The gyrating device as defined in claim 1, wherein said base of said stator is comprised of two low magnetic areas and two high magnetic areas whereby said two low magnetic areas serve to enable said first magnet of said rotor to remain on standby in one of said two high magnetic areas at the time when said induction coils of said stator are not driven by the voltage.

6. The gyrating device as defined in claim 1, wherein the reciprocating motion of said rotary disk of said rotor brings about an action force and a reaction force whereby the action force and the reaction force are changed at a speed by adjusting the voltage which is used to drive said induction coils, thereby resulting in a vibrating motion of said rotary disk.

7. The gyrating device as defined in claim 6, wherein the vibrating motion of said rotary disk is brought about in a desired pattern by adjusting the voltage in a specific pattern.

8. The gyrating device as defined in claim 6, wherein the intensity of the vibrating motion of said rotary disk is enhanced by attaching one or more weights to said rotary disk.

9. The gyrating device as defined in claim 1 further comprising a cover to shield said rotor and said stator.

10. The gyrating device as defined in claim 9, wherein one end of said spindle of said rotary disks of said rotor juts out of said cover to enable said spindle to be used as a drive shaft.

* * * * *